UNITED STATES PATENT OFFICE.

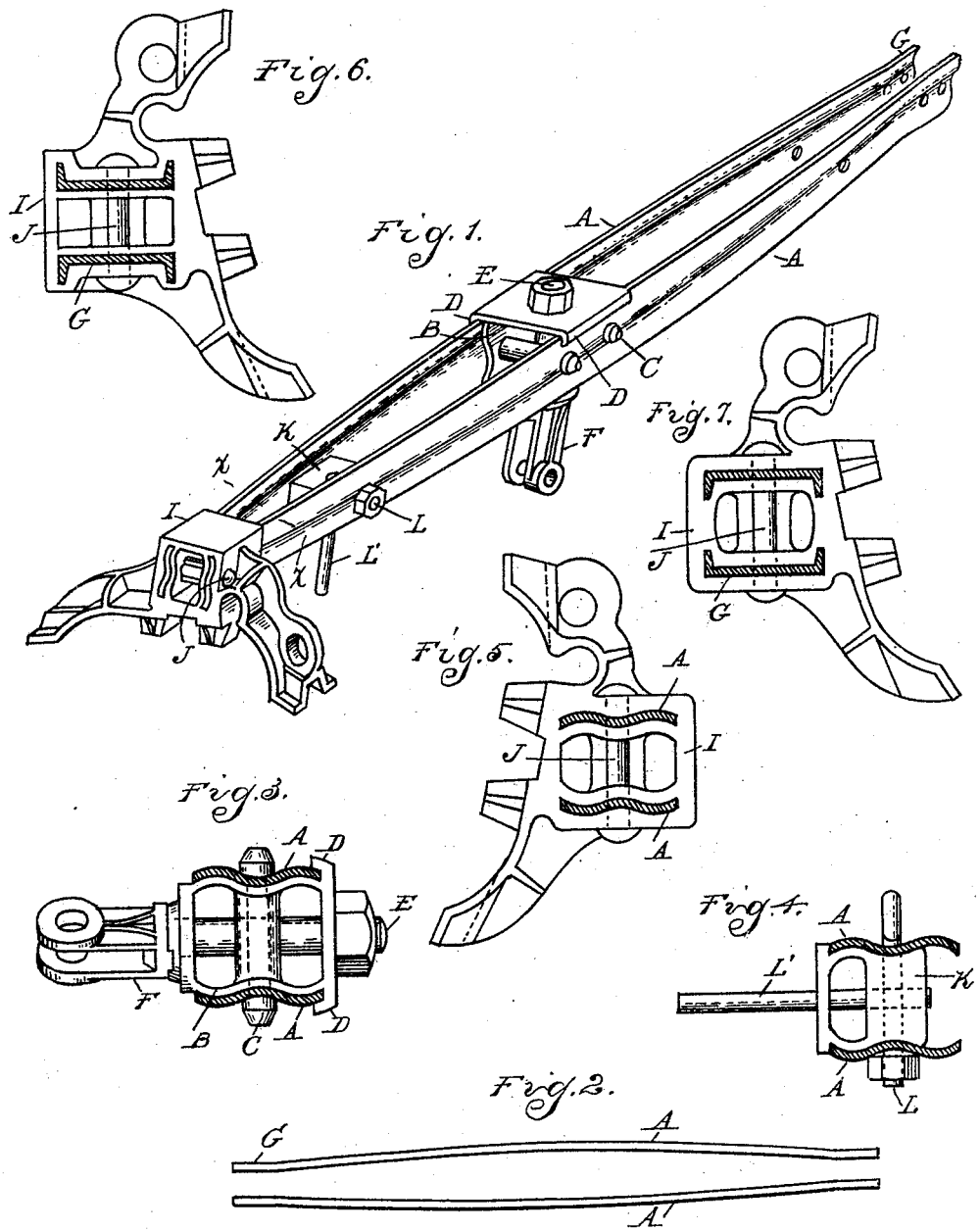

HARRY W. FROST, OF DETROIT, MICHIGAN.

BRAKE-BEAM.

No. 796,714.  Specification of Letters Patent.  Patented Aug. 8, 1905.

Application filed March 28, 1905. Serial No. 252,517.

*To all whom it may concern:*

Be it known that I, HARRY W. FROST, a citizen of the United States, residing at Detroit, in the county of Wayne and State of Michigan, have invented certain new and useful Improvements in Brake-Beams, of which the following is a specification, reference being had therein to the accompanying drawings.

The invention relates to new and useful improvements in brake-beams; and it consists in the construction of a beam composed of two horizontal cambered members secured together and having the brake-heads and fulcrum-block secured thereto.

It further consists in the construction, arrangement, and combination of the parts, as more fully hereinafter described, and particularly pointed out in the claims.

In the drawings, Figure 1 is a perspective view of my improved brake-beam. Fig. 2 is a plan view of the edges of the two cambered members. Fig. 3 is a vertical section through the beam near the center, showing the fulcrum-block in elevation. Fig. 4 is a similar section through the guard finger or pin. Fig. 5 is a section on line $x\,x$, Fig. 1; and Figs. 6 and 7 are similar sections showing the cambered members of channel form.

A represents two beam members. In Figs. 1, 2, and 5 I have shown these two members as formed of substantially flat metal, having shallow longitudinal corrugations or what may be termed of "wavy" cross-section. In Figs. 6 and 7 I have shown these members of channel form. The precise cross-section is not material, it being essential only that these members shall have sufficient horizontal section to provide the necessary strength to resist the horizontal braking strains. These two beams are oppositely bent or cambered, so as to be separated more at the middle than at the ends, and are tied together and held apart at the middle by the block B, the upper and lower faces of this block being shaped to fit and receive the inner faces of the two cambered members, as clearly illustrated in Fig. 3. Through the two members and the block pass the rivets or bolts C. I also preferably provide the flanges D at top and bottom of the block, against which the rear faces of the cambered members bear. E is the fulcrum-bolt, passing horizontally through the block B and having the usual bifurcated head F, in which the usual operating-lever is pivoted, this lever not being shown. At the ends these cambered members are preferably formed with the straight parallel portions G, which engage in correspondingly-shaped apertures in the brake-heads I. This is clearly shown in Figs. 5, 6, and 7.

J represents rivets or bolts passing through the brake-heads and the end portions of the members A and securely fastening them together.

K represents blocks secured between the members A, near the brake-heads, by vertical bolts L. The blocks K have horizontal apertures to receive the guard fingers or pins L', which slightly intersect the bolts L, being notched at the intersection, so that the bolts L hold the pins in, as well as clamp the blocks K in position.

It will be obvious that if channel-bars such as shown in Figs. 6 and 7 are used the seats therefor on the fulcrum-block B, pin-block K, and brake-heads must be made to conform thereto.

Brake-beams such as that here illustrated are suspended from the car-body or the car-truck by the brake-lever pivoted in the bifurcated head F, and when the beam is moved up, so the brake-shoes contact the wheels, not only is there a horizontal strain, due to the pull of the brake-lever, but the two ends tend to move downward or upward, due to the contact of the shoes on the rotating wheels. This, owing to the manner of supporting the beam, causes vertical and torsional strains, which the peculiar construction of my beam is especially adapted to resist. It is light, easy to manufacture and assemble, and amply strong to resist all the strains to which such a beam is subjected in use.

It will be observed that the cambered beam members are separated at their ends and engage separated apertures or bearings in the brake-heads. This is a decided advantage over a construction in which the ends of the beams enter a common aperture, as such common aperture materially weakens the brake-head at the center, while separated apertures or bearings away from the center do not so weaken it. Hence the brake-head may be made lighter for the same strength. In addition, this separation of the ends of the beam members strengthens the beam against torsional strains and this is aided by the intermediate blocks K.

What I claim as my invention is—

1. A brake-beam composed of brake-heads, having separated horizontal apertures, two oppositely - cambered metal beam members having their ends engaging in the apertures of the head, and a fulcrum-block at the middle between the beam members.

2. In a brake-beam, two oppositely-cambered metal beam members, a fulcrum-block secured at the middle between, a fulcrum-head carried thereby, and brake-heads, having separated apertures receiving the ends of the beam members and securing-rivets therefor.

3. In a brake-beam, the combination of two oppositely-cambered flat vertically-flanged beam members, a middle block between, brake-heads separately apertured to receive the ends of the beam members and secured thereto, and blocks intermediate the brake-heads and fulcrum-block.

In testimony whereof I affix my signature in presence of two witnesses.

HARRY W. FROST.

Witnesses:
H. C. SMITH,
FREDK. H. HOLT.